United States Patent
Coers et al.

(10) Patent No.: US 7,661,256 B2
(45) Date of Patent: Feb. 16, 2010

(54) HYBRID SEAM FOR A DRAPER BELT IN AN AGRICULTURAL HARVESTER

(75) Inventors: Bruce A. Coers, North Hillsdale, IL (US); Sheldon J. Grywacheski, Humboldt (CA); Benjamin M. Lovett, Colona, IL (US); Corwin M. Puryk, East Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/170,672

(22) Filed: Jul. 10, 2008

(65) Prior Publication Data

US 2010/0005767 A1 Jan. 14, 2010

(51) Int. Cl.
*A01D 43/00* (2006.01)

(52) U.S. Cl. .................. 56/181; 428/57; 198/844.2; 24/33 P; 474/254; 474/258

(58) Field of Classification Search .......... 56/181, 56/364, 177, 14.5; 198/844.2, 844.1, 848; 474/218, 253, 255, 257, 258, 254, 256; 24/38, 24/37, 33 L, 31 B, 33 P, 34, 33 C, 33 H, 31 R; 403/337, 335, 336, 338; 156/304.3, 304.5, 156/304.4; 428/57, 58, 59

See application file for complete search history.

(56) References Cited

U.S. PATENT DOCUMENTS

| | | | | |
|---|---|---|---|---|
| 390,233 A * | 10/1888 | Jackson | .......................... | 24/37 |
| 453,019 A | 5/1891 | McCombs | | |
| 460,799 A * | 10/1891 | McComb | ....................... | 24/38 |
| 934,321 A * | 9/1909 | Kelly | ......................... | 24/31 R |
| 1,235,656 A | 8/1917 | Cobb | | |
| 1,570,801 A | 1/1926 | Vollrath | | |
| 1,737,167 A | 11/1929 | Montigny | | |
| 1,803,354 A * | 5/1931 | Purple | ........................... | 24/37 |
| 1,818,297 A | 8/1931 | Bowlus | | |
| 1,932,203 A * | 10/1933 | Diamond | .................... | 24/33 C |
| 2,084,490 A * | 6/1937 | Hooper | ....................... | 24/33 C |
| 2,305,044 A * | 12/1942 | Toews | ..................... | 198/690.2 |
| 2,309,155 A * | 1/1943 | Johnson et al. | ............. | 24/31 F |
| 2,391,731 A * | 12/1945 | Miller et al. | ................ | 451/531 |
| 2,687,209 A * | 8/1954 | Rost et al. | ................ | 198/690.2 |
| 2,852,826 A * | 9/1958 | Carlson | ..................... | 24/31 R |
| 3,281,905 A | 11/1966 | Wagner | | |
| 3,546,054 A * | 12/1970 | Ross | .......................... | 474/254 |
| 4,316,536 A * | 2/1982 | Verbeek | ..................... | 198/699 |
| 4,476,902 A * | 10/1984 | Westhead | ............. | 139/383 AA |
| 4,489,827 A * | 12/1984 | Anderson | ................ | 198/844.2 |
| 4,540,389 A * | 9/1985 | Ramsey | ..................... | 474/257 |

(Continued)

*Primary Examiner*—Árpád Fábián-Kovács
(74) *Attorney, Agent, or Firm*—Taylor & Aust, P.C.

(57) ABSTRACT

A draper cutting platform for use in an agricultural harvester includes a platform section having an elongate belt. The belt includes opposite ends, a pair of side edges defining a width of the belt therebetween, and a plurality of longitudinally spaced cleats extending crosswise between the side edges. Each cleat has a length which is less than the width of the belt. A seam joins the opposite ends of the belt. The seam includes a splice bar and a pair of lacings. The splice bar has a length which is approximately the same as the cleat length. Each lacing is disposed in an area between a corresponding end of the splice bar and a respective side edge of the belt.

19 Claims, 5 Drawing Sheets

U.S. PATENT DOCUMENTS

| | | | |
|---|---|---|---|
| 4,611,367 A * | 9/1986 | Meulenberg et al. | 24/33 P |
| 4,721,497 A * | 1/1988 | Jager | 474/255 |
| 4,757,576 A * | 7/1988 | Jaubert | 24/31 R |
| 4,944,716 A * | 7/1990 | Graff | 474/255 |
| 4,996,750 A * | 3/1991 | Musil | 24/33 C |
| 5,050,728 A * | 9/1991 | Dimmer et al. | 198/844.2 |
| 5,099,548 A * | 3/1992 | Loosli | 24/38 |
| 5,136,832 A * | 8/1992 | Sund | 56/364 |
| 5,327,823 A | 7/1994 | Clevenger, Jr. et al. | |
| 5,415,913 A * | 5/1995 | Clevenger, Jr. | 428/58 |
| 5,632,701 A | 5/1997 | Neel | |
| 6,131,728 A * | 10/2000 | Rizhanovsky | 198/844.2 |
| 6,196,378 B1 | 3/2001 | Borner | |
| 6,202,397 B1 | 3/2001 | Watts et al. | |
| 6,238,131 B1 | 5/2001 | Watts et al. | |
| 6,896,124 B2 * | 5/2005 | Herold | 198/844.2 |
| 7,070,042 B2 * | 7/2006 | Dow et al. | 198/835 |
| 7,344,020 B2 * | 3/2008 | Grywacheski et al. | 198/844.2 |
| 7,543,428 B1 * | 6/2009 | Puryk et al. | 56/1 |
| 2008/0092508 A1 * | 4/2008 | Talbot et al. | 56/181 |

* cited by examiner

US 7,661,256 B2

HYBRID SEAM FOR A DRAPER BELT IN AN AGRICULTURAL HARVESTER

FIELD OF THE INVENTION

The present invention relates to agricultural harvesters, and, more particularly, to agricultural combines including a draper cutting platform.

BACKGROUND OF THE INVENTION

An agricultural harvester such as a combine includes a head and a feeder housing which remove the crop material from the field, gather the crop material and transport the crop material to a separator. In the case of thinner stemmed crops such as soybeans, wheat, etc. which may be cut with a sickle bar carrying a plurality of knives, the head may also be known as a cutting platform. The separator removes the grain crop material from the non-grain crop material. The grain is cleaned and deposited in a grain tank. When the grain tank becomes full, an unloading auger which is positioned alongside the combine during harvesting is moved to the unloading position in which the auger extends approximately perpendicular to the longitudinal axis of the combine. The combine drives alongside a vehicle into which the grain is to be unloaded, such as a semi-trailer, and the unloading auger is actuated to discharge the grain into the vehicle.

A cutting platform may generally be of two types. One type typically has a sheet metal floor with a dual feed auger near the rear of the cutting platform for feeding the crop material longitudinally to the feeder housing. A cutting platform of this type with auger feed is more common.

Another type of cutting platform, also known as a draper platform, utilizes a flat, wide belt, referred to as a draper or draper belt to convey crop material. The arrangement and number of belts vary among platforms. One style of draper platform has two side belts that convey crop material longitudinally, to the center of the platform, where a center feed belt moves the crop material laterally into the feeder housing. Each belt is wrapped around a pair of rollers, one being a drive roller and the other being an idler roller. An example of this type draper arrangement is disclosed in U.S. Pat. No. 6,202,397, which is assigned to the assignee of the present invention.

An advantage of a draper platform is that larger amounts of crop material can be transported without plugging, etc. For example, with wide platforms approaching 40 feet or even larger, the amount of crop material transported to the feeder housing can be substantial. With an auger feed platform, the crop material may bind between the auger and the back wall of the platform. In contrast, with a draper platform, the crop material is carried on top of the belt with less chance for plugging.

With a draper platform as described above, it is known to splice the ends of the draper belt together using a spice bar which extends the complete width of the belt. The splice bar typically includes a pair of bar clamps and a number of fasteners which pass through aligned holes in the bar clamps, as well as the opposite ends of the draper belt.

What is needed in the art is an improved construct and method for splicing the ends of a draper belt together in a draper cutting platform.

SUMMARY OF THE INVENTION

The invention in one form is directed to a draper cutting platform for use in an agricultural harvester. The cutting platform includes a platform section having an elongate belt with opposite ends, a pair of side edges defining a width of the belt therebetween, and a plurality of longitudinally spaced cleats extending crosswise between the side edges. Each cleat has a length which is less than the width of the belt. A seam joins the opposite ends of the belt. The seam includes a splice bar and a pair of lacings. The splice bar has a length which is approximately the same as the cleat length. Each lacing is disposed in an area between a corresponding end of the splice bar and a respective side edge of the belt.

The invention in another form is directed to an endless belt assembly, including an elongate belt having opposite ends, and a pair of side edges defining a width of the belt therebetween. A seam joins opposite ends of the belt. The seam includes a splice bar and a pair of lacings. The splice bar has a length which is less than the belt width. Each lacing is disposed in an area between a corresponding end of the splice bar and a respective side edge of the belt.

The invention in yet another form is directed to an agricultural harvester, including a feeder housing, and a cutting platform attached to the feeder housing. The cutting platform includes at least one platform section with an elongate belt assembly. The belt assembly includes an elongate belt and a seam joining opposite ends of the belt. The belt has opposite ends, and a pair of side edges defining a width of the belt therebetween. The seam includes a splice bar and a pair of lacings. The splice bar has a length which is less than the belt width. Each lacing is disposed in an area between a corresponding end of the splice bar and a respective side edge of the belt.

DETAILED DESCRIPTION OF THE INVENTION

Figure 1:
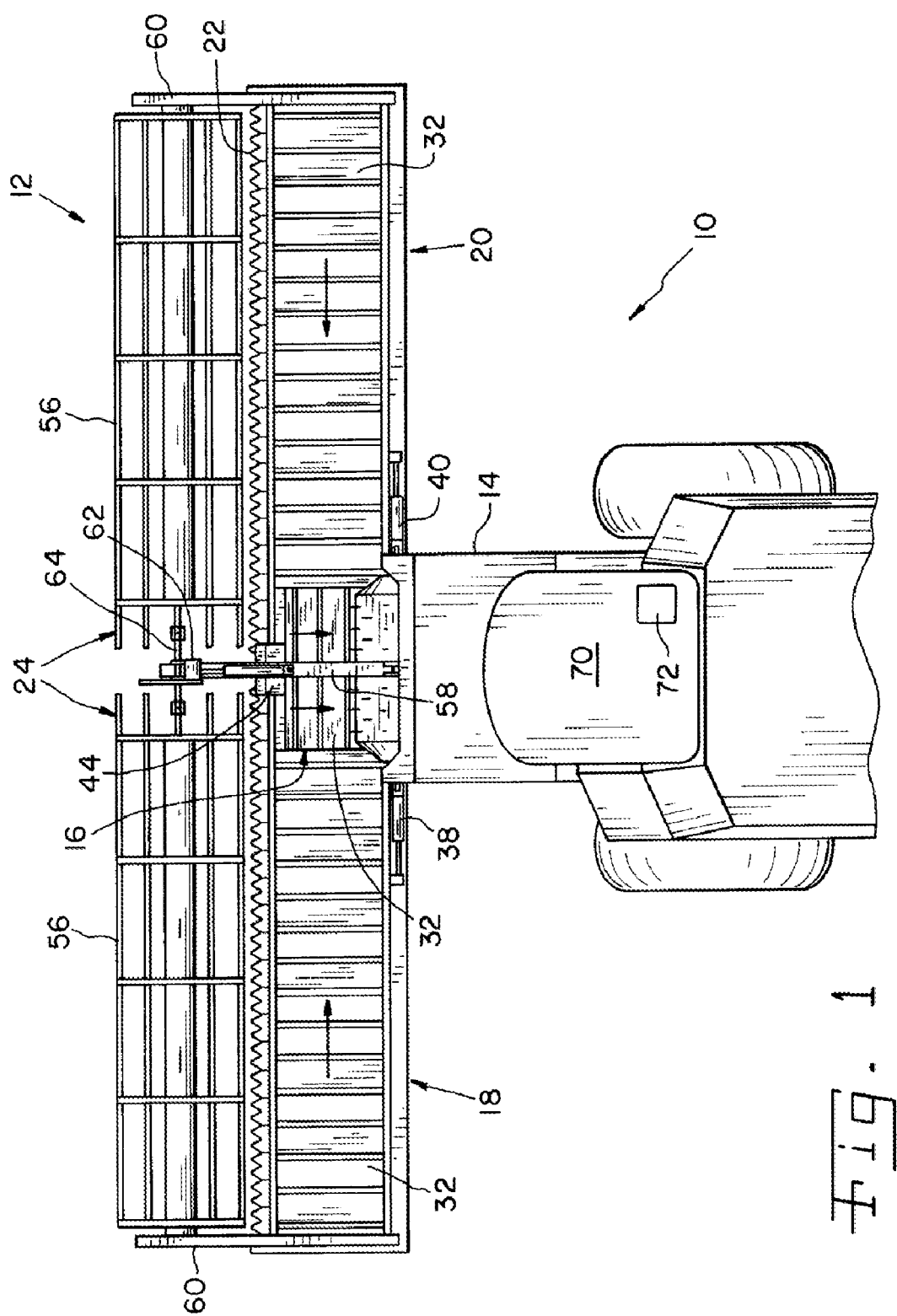
FIG. 1 is a fragmentary, top view of an agricultural combine including an embodiment of a draper platform of the present invention.
Figure 2:
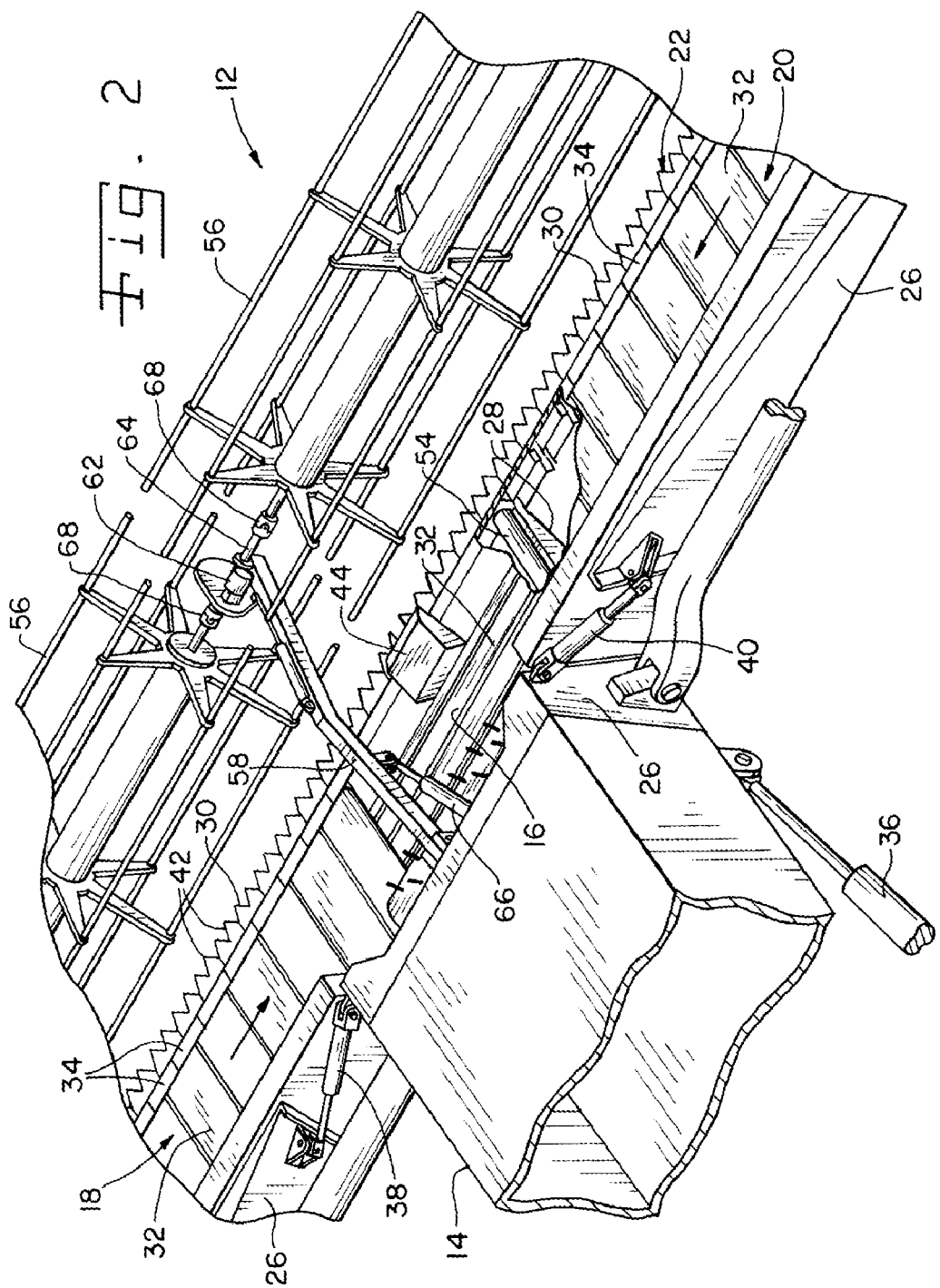
FIG. 2 is a fragmentary, perspective view of the agricultural combine of FIG. 1.
Figure 3:
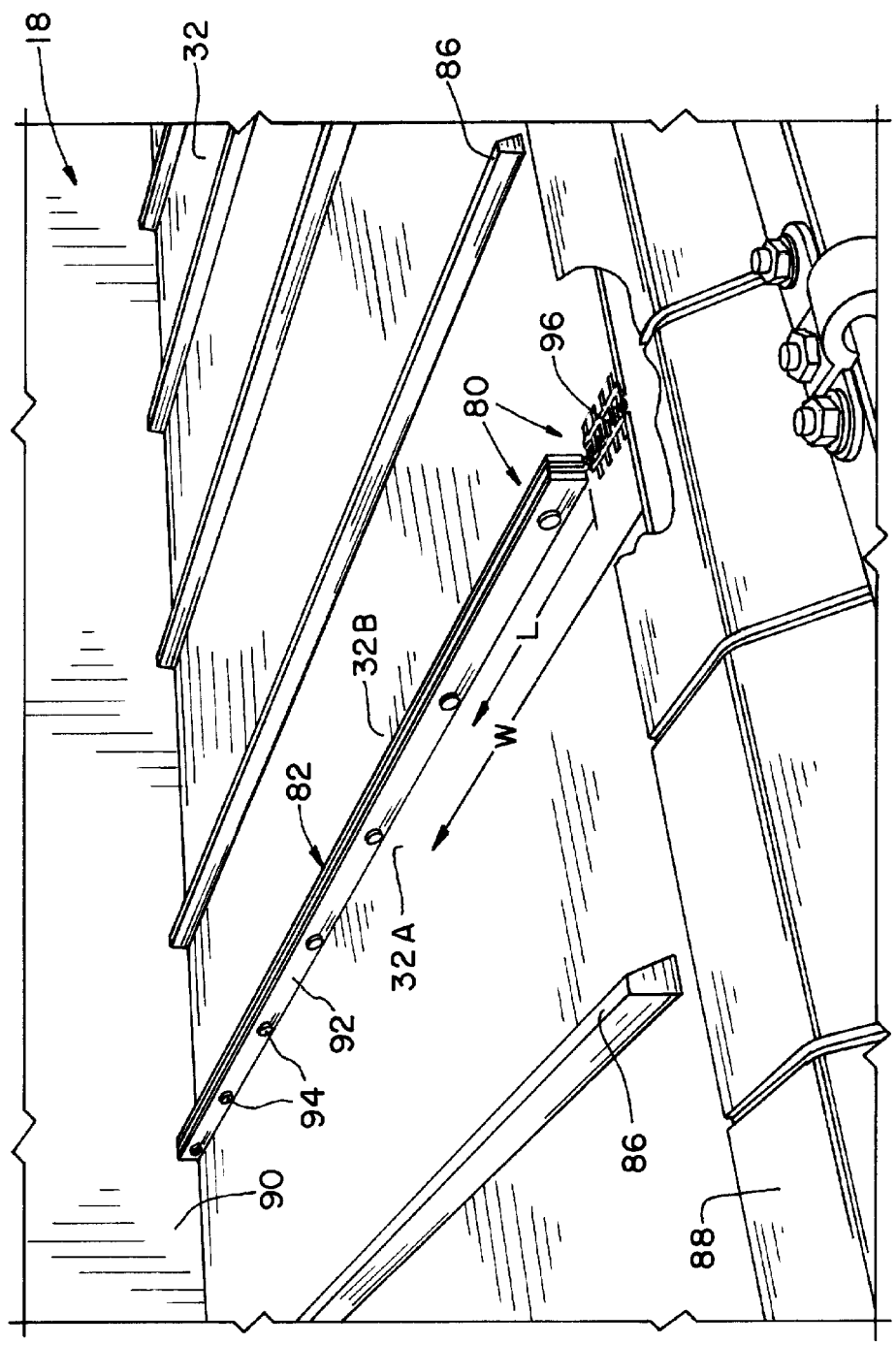
FIG. 3 is a fragmentary, perspective view of the seam for a draper belt used in the draper cutting platform shown in FIGS. 1 and 2.
Figure 4:
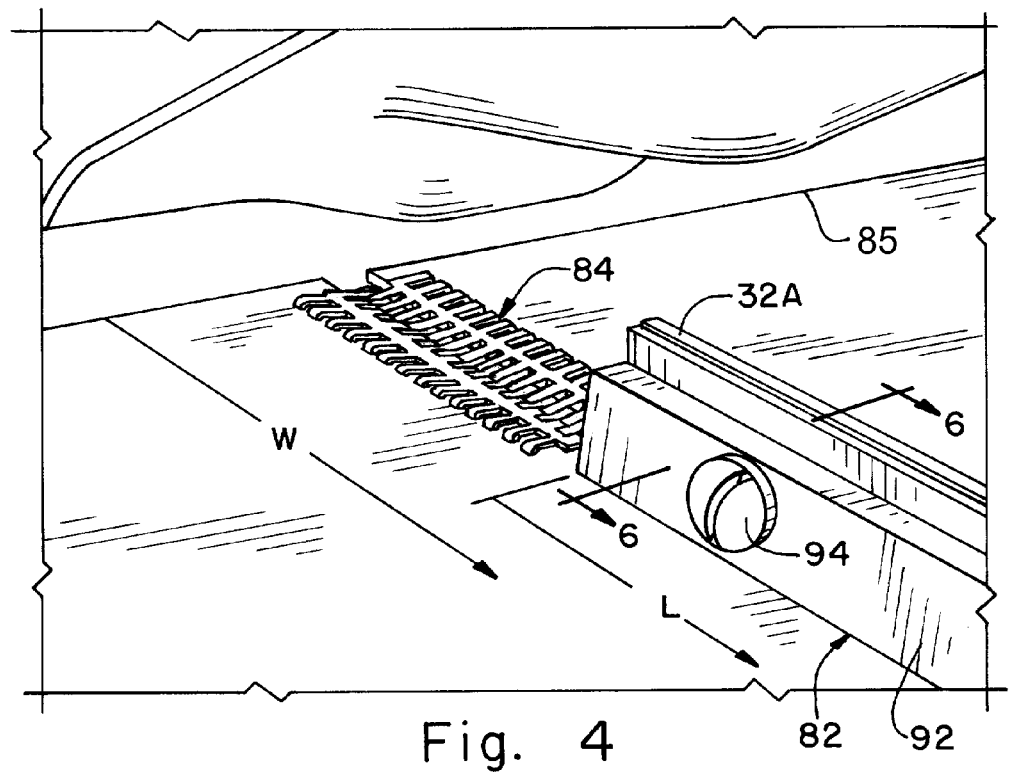
FIG. 4 is a fragmentary, perspective view of the rear edge of the seam shown in FIG. 3.
Figure 5:
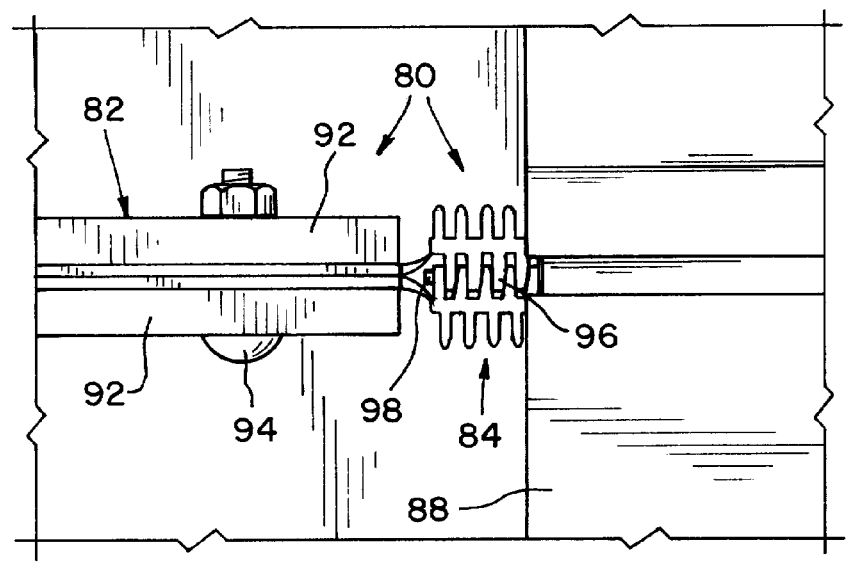
FIG. 5 is a top view of the front edge of the seam shown in FIGS. 3 and 4.

Referring now to the drawings, and, more particularly to FIGS. 1 and 2, there is shown an agricultural harvester in the form of a combine 10 including an embodiment of a cutting platform 12 of the present invention. Combine 10 includes a feeder housing 14 which is detachably coupled with cutting platform 12. Feeder housing 14 receives the crop material from cutting platform 12, both grain and non-grain crop material, and transports the crop material to a separator within combine 10 in known manner (not shown). The grain crop material is separated from the non-grain crop material, cleaned and transported to a grain tank. The non-grain crop material is transported to a chopper, blower, etc. in known manner and distributed back to the field.

Cutting platform 12 generally includes a plurality of platform sections 16, 18 and 20, a cutterbar assembly 22 and a reel assembly 24. In the embodiment shown, platform section 16 is a center platform section, platform section 18 is a first wing platform section, and platform section 20 is a second wing platform section. Although shown with three platform sections, cutting platform 12 may be configured with more or less platform sections, depending upon the particular application.

Each platform section 16, 18 and 20 generally includes a frame 26, a plurality of float arms 28 coupled with a respective frame 26, a cutterbar assembly 22 carried by the outboard ends of respective float arms 28, and at least one endless belt 32 (FIG. 2). The frame 26 of first wing platform section 18 and second wing platform section 20 are each pivotally coupled with center platform section 16, such that the outboard ends of first wing platform section 18 and second wing platform section 20 can move up and down independent from center platform section 16. To that end, a lift cylinder 36 coupled between the frame of combine 10 and feeder housing 14 lifts the entire cutting platform 12, a first tilt cylinder 38 coupled between the respective frame 26 of first wing platform section 18 and center platform section 16 pivotally moves first wing platform section 18 relative to center platform section 16, and a second tilt cylinder 40 coupled between the respective frame 26 of second wing platform section 20 and center platform section 16 pivotally moves second wing platform section 20 relative to center platform section 16.

Reel assembly 24 includes two reels 56, center reel support arm 58 and a pair of outer reel support arms 60. Outer reel support arms 60 are pivotally coupled at one end thereof with an outboard end of a respective first wing platform section 18 or second wing platform section 20. Outer reel support arms 60 rotationally carry a respective reel 56 at an opposite end thereof. Each outer reel support arm 60 may be selectively moved up and down using a hydraulic cylinder, and the pair of hydraulic cylinders are typically coupled in parallel so that they move together upon actuation.

Center reel support arm 58 is pivotally coupled at one end thereof with center platform section 16 above the opening leading to feeder housing 14. Center reel support arm 58 rotationally carries an inboard end of each reel 56 at an opposite end thereof. A hydraulic motor 62 or other suitable mechanical drive rotationally drives each reel 56. More particularly, hydraulic motor 62 drives a common drive shaft 64 through a chain and sprocket or other suitable arrangement (not shown). The rotational speed of reels 56 can be adjusted by an operator by adjusting the rotational speed of hydraulic motor 62.

Center reel support arm 58 may be selectively moved up and down using a hydraulic cylinder 66. Center reel support arm 58 is movable independently from outer reel support arms 60. To accommodate this independent movement, drive shaft 64 driven by hydraulic motor 62 is coupled at each end thereof via a universal joint 68 with a respective reel 56. This independent movement of center reel support arm 58 can be accomplished manually using a separate actuating switch or lever in operator's cab 70, or automatically using an electronic controller 72 located within cab 70 or other suitable location.

Referring to FIGS. 3-6, platform section 18 is shown as including an endless belt assembly with elongate belt 32 and a seam 80 joining the opposite longitudinal ends 32A and 32B of belt 32. Seam 80 generally includes a splice bar 82 and a pair of lacings 84. Splice bar 82 has a length L which is less than the width W of belt 32 extending between opposite side edges 85. The length L of splice bar 82 also generally corresponds to the length of cleats 86 which extend from belt 32 and assist in moving crop material toward feeder housing 14. Splice bar 82 also lies laterally within an area bounded on a front edge by a front overlapping structure 88 and bounded on a rear edge by a rear overlapping structure 90. Front overlapping structure 88 and rear overlapping structure 90 each overlap a respective lacing 84 in an area between splice bar 82 and a respective side edge 85. In the embodiment shown, front overlapping structure 88 is in the form of a plurality of crop ramps, and rear overlapping structure 90 is in the form of a rear wall.

Figure 6:
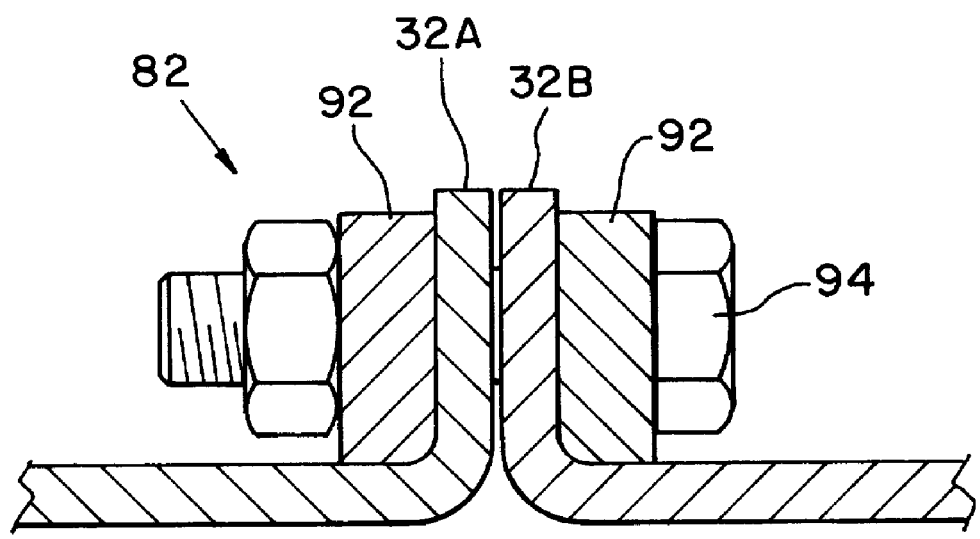
FIG. 6 is a sectional view of the seam, taken at line 6-6 in FIG. 4.

Splice bar 82 includes a pair of bar clamps 92 and a plurality of fasteners 94 extending through aligned holes in bar clamps 92 and belt ends 32A and 32B. Bar clamps 92 can have a contoured cross-section as shown in FIG. 6, or can have a different shape such as a rectangular shape, etc. Fasteners 94 can be in the form of carriage bolts (FIGS. 3-5), hexhead bolts (FIG. 6), rivets, etc.

Each lacing 84 is disposed in an area between a corresponding end of splice bar 82 and a respective side edge 85 of belt 32. In the illustrated embodiment, each lacing 84 has a length extending between splice bar 82 and a respective side edge 85 which is approximately the same. However, depending upon the application, it will be appreciated that lacings 84 may have different lengths at the front and rear of belt 32.

Each lacing 84 includes a plurality of interdigitating loops 96 and a pin 98 extending through the loops 96. The loops are enmeshed, adhered, etc. using known techniques to a respective belt end 32A or 32B. Other types of lacings are also possible.

With belts having conventional seams, it is known to use either a splice bar or a lacing across the entire width of the seam, but not both. However, with a draper platform section as described above, the crop ramps 88 at the front and the rear wall 90 at the back overlap the front and rear edges of the belt 32 to prevent crop material from cycling past the belt. The splice bar 82 functions during operation the same as the other cleats 86 to move the crop material toward the feeder housing 14, and is spaced apart in the longitudinal direction the same as the distance between cleats 86. On the other hand, the lacing at each end of the splice bar 82 effectively holds together the belt ends 32A and 32B while not interfering with movement under crop ramps 88 or rear wall 90.

Having described the preferred embodiment, it will become apparent that various modifications can be made without departing from the scope of the invention as defined in the accompanying claims.

The invention claimed is:

1. A draper cutting platform for use in an agricultural harvester, said cutting platform comprising:
   a platform section including an elongate belt having opposite ends, a pair of side edges defining a width of said belt therebetween, and a plurality of longitudinally spaced cleats extending crosswise between said side edges, each said cleat having a length which is less than said width of said belt; and
   a seam joining said opposite ends of said belt, said seam including a splice bar with a length which is approximately the same as said cleat length, and a pair of lacings, each said lacing disposed in an area between a corresponding end of said splice bar and a respective said side edge of said belt.

2. The draper cutting platform of claim 1, wherein said splice bar includes a pair of bar clamps and a plurality of fasteners extending through said bar clamps.

3. The draper cutting platform of claim 1, wherein each said lacing includes a plurality of interdigitating loops and a pin extending through said loops.

4. The draper cutting platform of claim 1, wherein each said lacing has a length extending between said splice bar and said respective side edge which is approximately the same.

5. The draper cutting platform of claim 1, wherein said pair of lacings include a front lacing and a rear lacing, and including a front overlapping structure which overlaps said front edge of said belt in an area of a front lacing, and a rear overlapping structure which overlaps a rear edge of said belt in an area of said rear lacing.

6. The draper cutting platform of claim 5, wherein said front overlapping structure is a plurality of crop ramps, and said rear overlapping structure is a rear wall.

7. The draper cutting platform of claim 1, wherein said plurality of transverse cleats are longitudinally spaced apart a common distance from each other, and wherein said splice bar is spaced said common distance from each of a pair of adjacent said cleats.

8. An endless belt assembly, comprising:
an elongate belt having opposite ends, and a pair of side edges defining a width of said belt therebetween; and
a seam joining said opposite ends of said belt, said seam including a splice bar and a pair of lacings, said splice bar having a length which is less than said belt width, each said lacing disposed in an area between a corresponding end of said splice bar and a respective said side edge of said belt.

9. The endless belt assembly of claim 8, wherein said splice bar includes a pair of bar clamps and a plurality of fasteners extending through said bar clamps.

10. The endless belt assembly of claim 8, wherein each said lacing includes a plurality of interdigitating loops and a pin extending through said loops.

11. The endless belt assembly of claim 8, wherein each said lacing has a length extending between said splice bar and said respective side edge which is approximately the same.

12. The endless belt assembly of claim 8, wherein said belt includes a plurality of longitudinally spaced cleats extending crosswise between said side edges, each said cleat having a common length which is less than said width of said belt, said splice bar having a length which is approximately the same as said cleats.

13. An agricultural harvester, comprising:
a feeder housing; and
a cutting platform attached to said feeder housing, said cutting platform including at least one platform section with an elongate belt assembly, said belt assembly including an elongate belt and a seam joining opposite ends of said belt, said belt having a pair of side edges defining a width of said belt therebetween, said seam including a splice bar and a pair of lacings, said splice bar having a length which is less than said belt width, each said lacing disposed in an area between a corresponding end of said splice bar and a respective said side edge of said belt.

14. The agricultural harvester of claim 13, wherein said splice bar includes a pair of bar clamps and a plurality of fasteners extending through said bar clamps.

15. The agricultural harvester of claim 13, wherein each said lacing includes a plurality of interdigitating loops and a pin extending through said loops.

16. The agricultural harvester of claim 13, wherein each said lacing has a length extending between said splice bar and said respective side edge which is approximately the same.

17. The agricultural harvester of claim 13, wherein said belt includes a plurality of longitudinally spaced cleats extending crosswise between said side edges, each said cleat having a common length which is less than said width of said belt, said splice bar having a length which is approximately the same as said cleats.

18. The agricultural harvester of claim 13, wherein said pair of lacings include a front lacing and a rear lacing, and including a front overlapping structure which overlaps a front edge of said belt in an area of a said front lacing, and a rear overlapping structure which overlaps a rear edge of said belt in an area of a said rear lacing.

19. The agricultural harvester of claim 18, wherein said front overlapping structure is a plurality of crop ramps, and said rear overlapping structure is a rear wall.

* * * * *